UNITED STATES PATENT OFFICE.

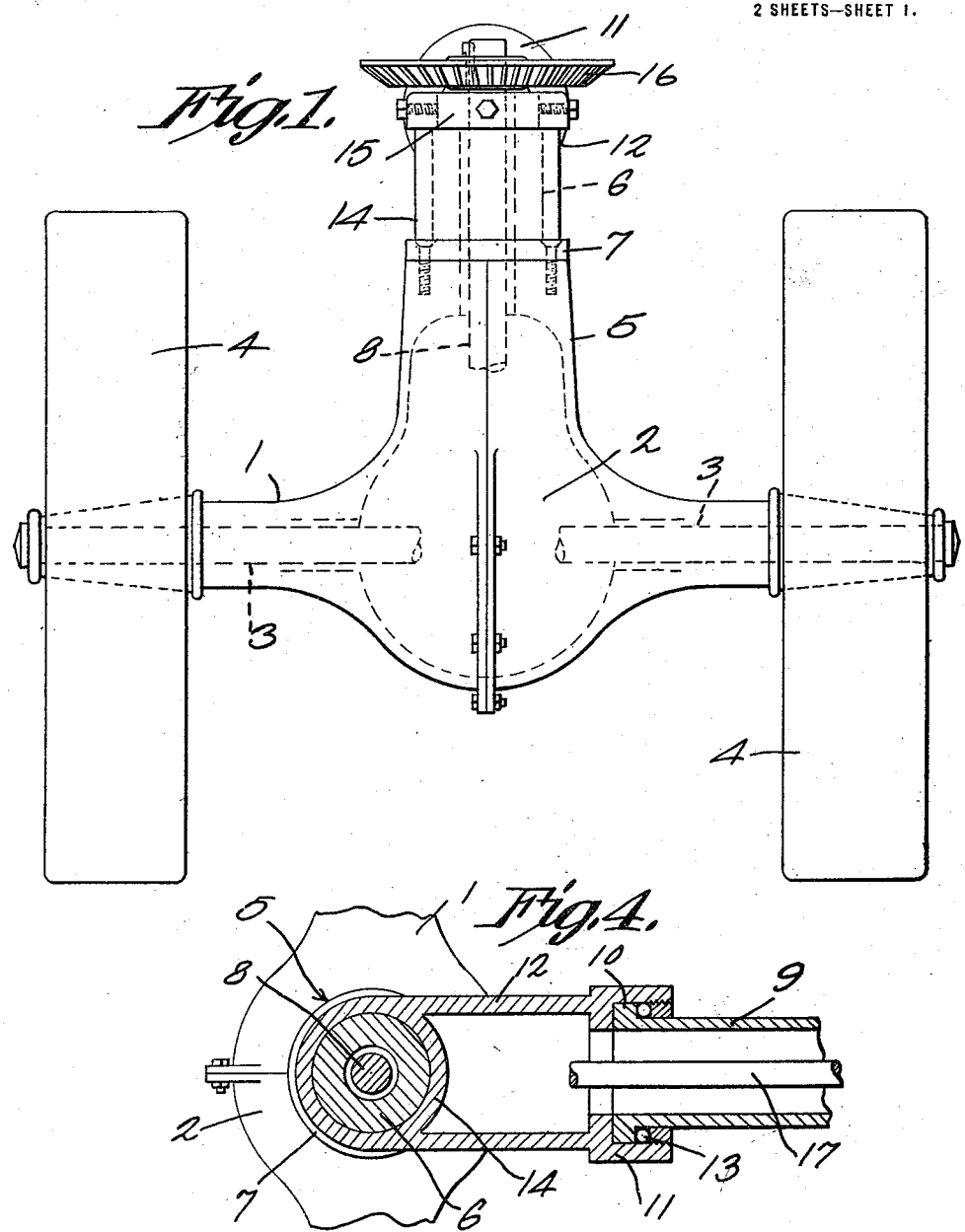

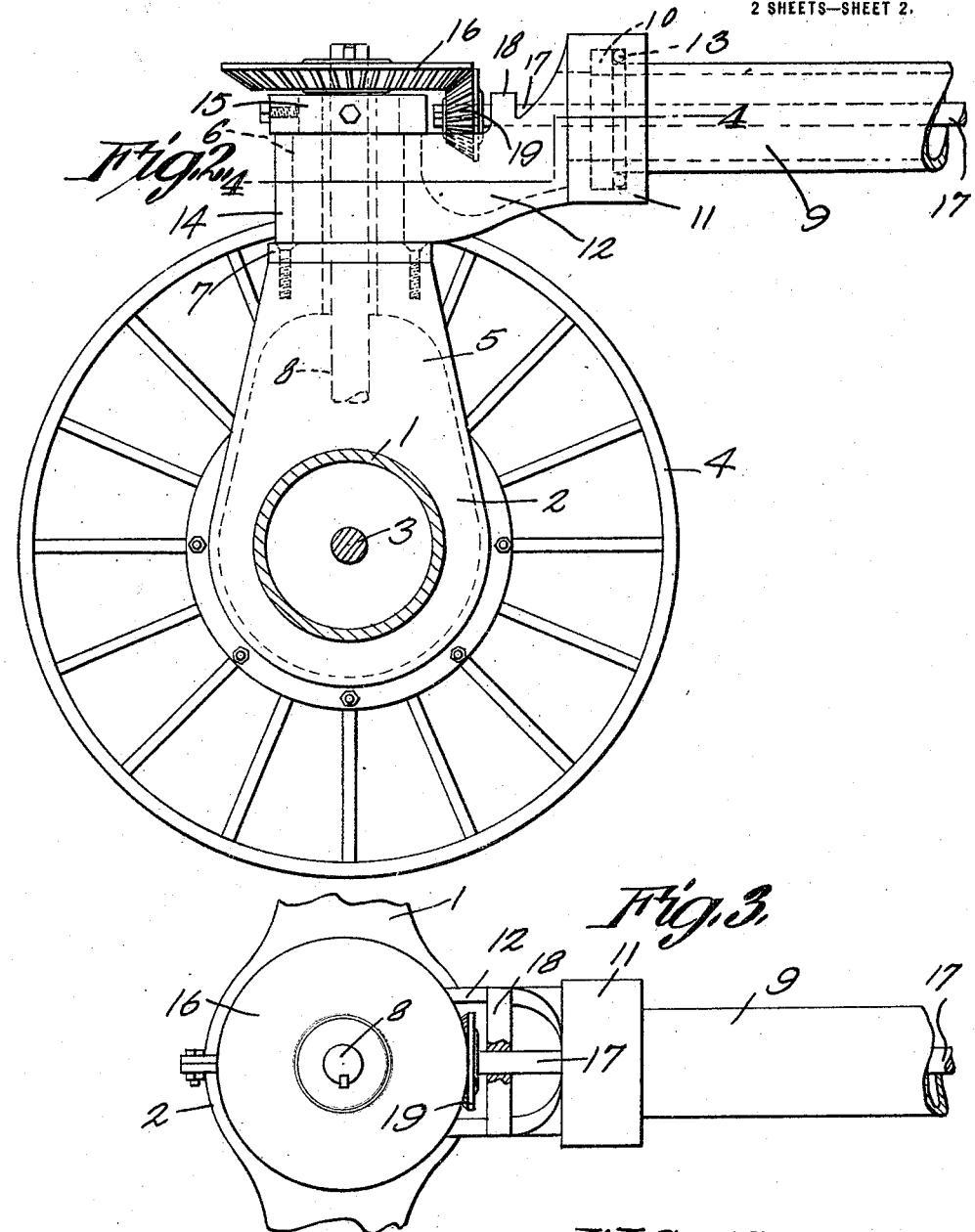

WELLINGTON C. ALLEN, OF ENID, OKLAHOMA.

RUNNING-GEAR FOR TRACTORS.

1,236,646.			Specification of Letters Patent.		Patented Aug. 14, 1917.

Application filed January 17, 1917. Serial No. 142,901.

*To all whom it may concern:*

Be it known that I, WELLINGTON C. ALLEN, a citizen of the United States, residing at Enid, in the county of Garfield and State of Oklahoma, have invented a new and useful Running-Gear for Tractors, of which the following is a specification.

The present invention appertains to vehicle running gears, and aims to provide a novel and improved running gear adapted especially for use upon tractors.

It is the object of the invention to provide a novel and improved construction enabling power to be applied to a pair of ground wheels for propelling the tractor, and also enabling said wheels to be angled about a vertical axis for steering purposes, the structure being used at either or both ends of the tractor, whereby all four wheels of the tractor can be driven and angled, thus enabling the tractor to be controlled effectively, and to operate in a most efficient manner on uneven ground or road, the mechanism being flexible to accommodate the inequalities in the surface traversed by the tractor.

A further object of the invention is to provide a running gear possessing a novel assemblage of the component elements, to enhance the utility and efficiency thereof.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein—

Figure 1 is a front view of the improved construction.

Fig. 2 is a side elevation thereof, portions being broken away.

Fig. 3 is a plan view of the mechanism, portions being broken away.

Fig. 4 is a section taken on the line 4—4 of Fig. 2.

The mechanism embodies a tubular or hollow axle 1 similar to those now universally used in motor vehicles, the axle or axle housing being provided between its ends with a casing 2 for housing the differential mechanism (not shown) of any suitable construction. The sections 3 of the axle shaft extend from the differential casing 2 through the terminals of the axle housing 1 and have secured upon their remote ends the ground wheels 4.

In carrying out the invention, the differential casing 2 is provided with an upstanding or vertical standard 5, and an upstanding or vertical pintle 6 is secured upon the end of the standard 5, the lower end of the pintle 6 having an outstanding flange 7 bolted or otherwise fastened to the end of the standard. A vertical shaft 8 extends through the standard 5 and pintle 6 to transmit the power to the differential mechanism, from which the power is distributed to the axle shaft sections 3 in the usual manner.

There is employed a tubular frame member 9, disposed longitudinally, and forming a part of the frame of the tractor. The end of the frame member 9 has an annular outstanding flange 10 upon which a collar 11 is swiveled for rotary movement about the longitudinal horizontal axis of the member 9. The collar 11 forms one end of a coupling member 12, the intermediate portion of which is preferably of U-shaped section. The collar 11 at one end of the member 12 is in a vertical plane and is swiveled upon the frame member 9, while the other end of the member 12 is provided with a collar 14 disposed in a horizontal plane and having its axis vertical. The collar 14 is fitted rotatably over the pintle 6 and seats on the flange 7, a retaining collar 15 being secured upon the upper end of the pintle 6 by means of set screws or otherwise to hold the parts assembled.

A beveled gear wheel 16 is secured upon the upper protruding end of the shaft 8 and meshes with a bevel pinion 19 disposed below it partially within the member 12. The pinion 19 is secured to the end of a longitudinal drive shaft 17 extending longitudinally within the frame member 9 and adapted to be operated by the engine or other prime mover (not shown). The member 12 is provided between its ends with a yoke or transverse bearing 18 through which the shaft 17 is journaled adjacent to the gear wheel 16, whereby to properly support the shaft 17. It is evident that when the shaft 17 is rotated, the pinion 19 transmits the movement through the medium of the gear wheel 16 to the shaft 8 from which the power is transmitted by way of the differential mechanism to the shaft sections 3 and wheels 4. Attention is directed to the fact that the axle 1 can be swung about a vertical axis, due to the fact that the pintle 6 can turn in the collar 14, thereby enabling the axle 1 to be angled for purpose of steering the vehicle. Furthermore, the axle can tilt sidewise when the wheels move over uneven ground, since the axle 1 and its standard 5 can swing transversely with the member 12 due to the swivel connection of the member 12 with the frame member 9. This enables the wheels to pass over obstructions, one wheel being readily raised higher than the other one or moving downwardly relative to the other wheel when passing through a mud hole or rut.

Having thus described the invention, what is claimed as new is:

A running gear embodying an axle housing having a standard, an upstanding pintle secured upon said standard, a vertical shaft extending upwardly through said standard and pintle, a coupling member having collars at its ends, one collar having its axis vertical and being journaled for rotation on said pintle, the other collar having its axis horizontal, a retaining member on said pintle holding the first mentioned collar thereon, a tubular frame member having its end swiveled for rotation in the second mentioned collar, said coupling member having a bearing between its collars, a shaft extending longitudinally within said member and journaled through said bearing, and a gearing connecting said shafts.

In testimony that I claim the foregoing as my own, I have hereto affixed my signature in the presence of two witnesses.

WELLINGTON C. ALLEN.

Witnesses:
P. C. SIMONS,
C. H. PARKER.

Copies of this patent may be obtained for five cents each, by addressing the "Commissioner of Patents, Washington, D. C."